(12) United States Patent
Kong et al.

(10) Patent No.: US 10,536,573 B2
(45) Date of Patent: Jan. 14, 2020

(54) MOBILE TERMINAL AND METHOD FOR CONTROLLING THE SAME

(71) Applicant: LG ELECTRONICS INC., Seoul (KR)

(72) Inventors: Daejin Kong, Seoul (KR); Suhjin Yi, Seoul (KR); Juhyun Jung, Seoul (KR); Yujune Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 480 days.

(21) Appl. No.: 15/166,616

(22) Filed: May 27, 2016

(65) Prior Publication Data

US 2017/0013115 A1    Jan. 12, 2017

(30) Foreign Application Priority Data

Jul. 8, 2015 (KR) .................. 10-2015-0097360

(51) Int. Cl.

| | |
|---|---|
| *H04N 21/00* | (2011.01) |
| *G06F 3/0481* | (2013.01) |
| *H04M 1/725* | (2006.01) |
| *H04W 4/80* | (2018.01) |
| *H04W 76/14* | (2018.01) |
| *G06F 1/3234* | (2019.01) |
| *G06F 3/0484* | (2013.01) |
| *G06F 3/041* | (2006.01) |
| *G06F 3/044* | (2006.01) |

(52) U.S. Cl.
CPC ...... *H04M 1/72558* (2013.01); *G06F 1/3265* (2013.01); *G06F 3/044* (2013.01); *G06F 3/0416* (2013.01); *G06F 3/04842* (2013.01); *H04M 1/7253* (2013.01); *H04W 4/80* (2018.02); *H04W 76/14* (2018.02); *Y02D 10/153* (2018.01)

(58) Field of Classification Search
CPC . G06F 3/165; G06F 3/0482; H04L 2012/2849
See application file for complete search history.

(56) References Cited

U.S. PATENT DOCUMENTS

| | | | |
|---|---|---|---|
| 9,245,441 B1* | 1/2016 | Poojary | ................. G08C 17/02 |
| 10,334,324 B2* | 6/2019 | Navin | .................. H04N 21/812 |
| 10,375,428 B2* | 8/2019 | Perez | ..................... G06Q 30/02 |
| 2006/0285677 A1 | 12/2006 | Souma | |
| 2007/0299737 A1* | 12/2007 | Plastina | ............. G06Q 30/0207 |
| | | | 705/14.1 |
| 2010/0031366 A1* | 2/2010 | Knight | .................. G06Q 10/10 |
| | | | 726/26 |

(Continued)

*Primary Examiner* — Jordany Nunez
(74) *Attorney, Agent, or Firm* — Birch, Stewart, Kolasch & Birch, LLP

(57) ABSTRACT

A mobile terminal including a display including a first area and a second area extended in at least one direction of the first area; a wireless communication processor configured to wirelessly communicate with an external device; and a controller configured to display, in the second area, visual information corresponding to at least one replay file executed when the mobile terminal was previously connected to the external device, based on the mobile terminal being connected to the external device when the first area and the second area are non-activated, and execute the at least one replay file, based on a predetermined touch input applied to the second area.

18 Claims, 17 Drawing Sheets

(56) References Cited

U.S. PATENT DOCUMENTS

| | | |
|---|---|---|
| 2011/0022203 A1 | 1/2011 | Woo et al. |
| 2014/0015743 A1 | 1/2014 | Seo et al. |
| 2014/0059494 A1 | 2/2014 | Lee et al. |
| 2014/0176299 A1* | 6/2014 | Kumar .................. G06F 3/165 |
| | | 340/4.42 |
| 2014/0320425 A1 | 10/2014 | Jeong et al. |
| 2015/0148106 A1* | 5/2015 | Choi .................. H04W 52/027 |
| | | 455/566 |
| 2016/0173046 A1* | 6/2016 | Lee .................... H03G 3/3005 |
| | | 381/104 |

* cited by examiner

MOBILE TERMINAL AND METHOD FOR CONTROLLING THE SAME

CROSS-REFERENCE TO RELATED APPLICATIONS

This application claims the benefit of priority of Korean Patent Application No. 10-2015-0097360, filed on Jul. 8, 2015, which is herein expressly incorporated by reference in their entireties.

BACKGROUND OF THE INVENTION

1. Field of the Invention

The present disclosure relates to a mobile terminal including a display unit composed of a plurality of areas and a method for controlling the mobile terminal.

2. Description of the Conventional Art

As a mobile terminal has enhanced functions and reinforced multimedia functions, the size of a display unit becomes larger, and the image quality of the display unit becomes higher as high resolution. Therefore, a large amount of power is consumed in driving the display unit of the mobile terminal.

In general, if a display unit is activated, the entire screen of the display unit is activated, and hence almost constant power is always consumed. Therefore, as the time for which the display unit is left in the activated state increases, the power consumption of a battery increases.

In addition, there exist needs to execute different replay files according to kinds of external devices connected to a terminal. However, a replay file which is being executed is currently reproduced regardless of the kind of external device connected to the terminal.

SUMMARY OF THE INVENTION

Therefore, an aspect of the detailed description is to provide a mobile terminal and a method for controlling the same, which can independently activate a portion of a display unit according to a user's demand, thereby reducing power consumption.

Another aspect of the detailed description is to provide a mobile terminal and a method for controlling the same, which can selectively activate and operate a partial area in a single display unit composed of a main area and an extension area.

Still another aspect of the detailed description is to provide a mobile terminal and a method for controlling the same, in which when the mobile terminal is connected to an external device, a list of replay files which were executed when the mobile terminal was previously connected to the external device can be activated and output in an extension area of a display unit.

To achieve these and other advantages and in accordance with the purpose of this specification, as embodied and broadly described herein, a mobile terminal includes: a display unit configured to include a first area and a second area formed to extend in at least one direction of the first area; a wireless communication unit configured to transmit/receive signals of an external device; and a controller configured to output, in the second area, visual information corresponding to at least one replay file which was executed when the mobile terminal was previously connected to the external device, based on that the mobile terminal is connected to the external device when the first area and the second area are non-activated, and control execution of the at least one replay file, based on a predetermined touch input is applied to the second area.

To achieve these and other advantages and in accordance with the purpose of this specification, as embodied and broadly described herein, a method for controlling a mobile terminal includes: (a) outputting, in a second area formed to extend in at least one direction of a first area, visual information corresponding to at least one replay file which was executed when the mobile terminal was previously connected to an external device, based on that the mobile terminal is connected to the external device when the first area and the second area are non-activated; and (b) controlling executing of the at least one replay file, based on that a predetermined touch input is applied to the second area.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWING

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF EMBODIMENTS

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
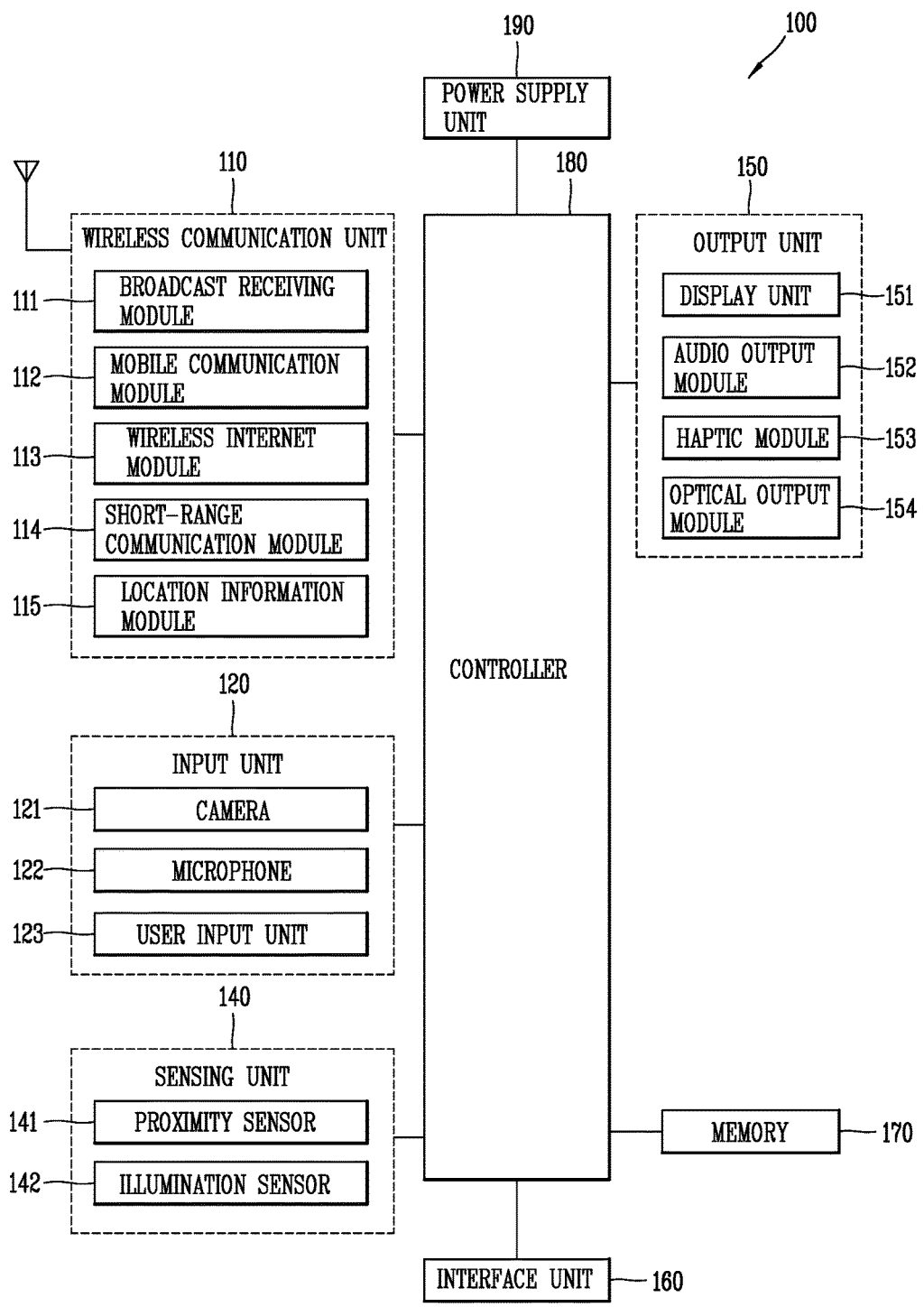
FIG. 1A is a block diagram illustrating a mobile terminal according to an embodiment.
Figure 1B:
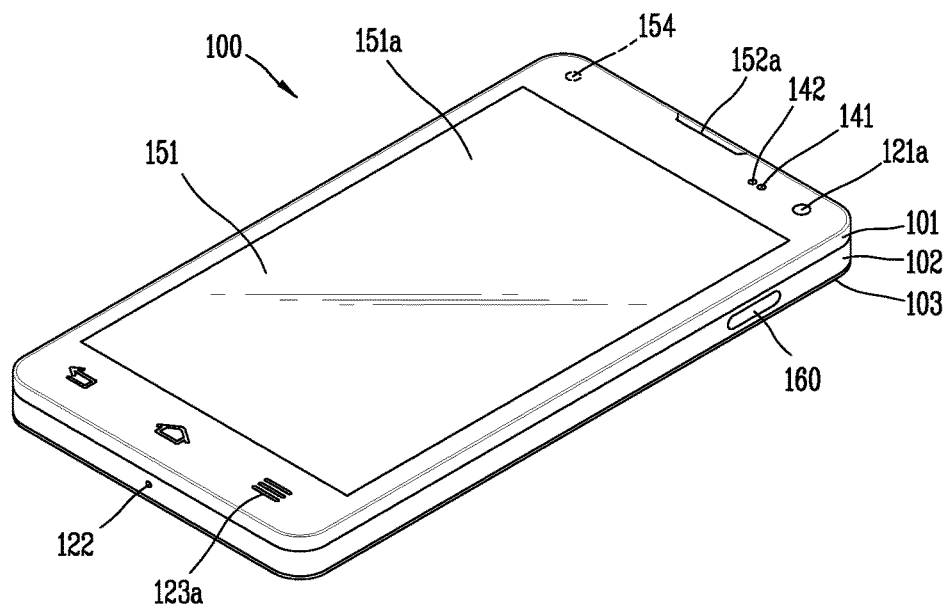
FIGS. 1B and 1C are conceptual views illustrating an example of the mobile terminal viewed in different directions according to the embodiment.
Figure 1C:
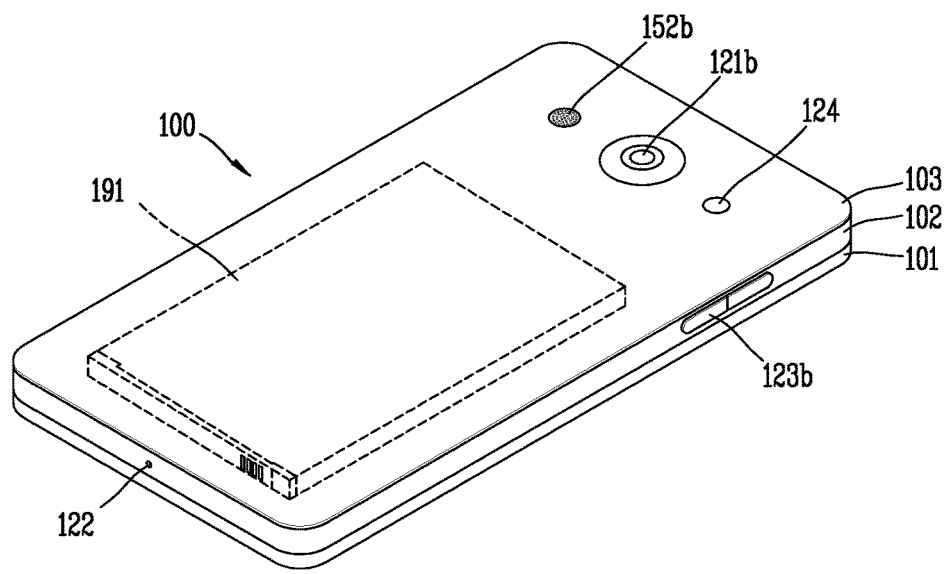

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method for a glass type terminal according to various embodiments to be explained later. The operation or the control method for the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor provided at the display unit 151 may be configured to sense taps in an activated state and a deactivated state, using different methods. The different methods may be associated with an activation period of the touch sensor. More specifically, the touch sensor may be activated with a different period according to an activated state or a deactivated state of the display unit 151. That is, the touch sensor may sense a tap applied thereon, with a different activation period, according to an activated state or a deactivated state of the display unit 151.

For instance, in a deactivated state of the display unit 151, the touch sensor may be activated with a preset period. In this instance, the preset period may be a time period more than 0. Further, in an activated state of the display unit 151, the touch sensor may be always operated in an activated state. In this instance, an activation period of the touch sensor may be a time period of 0 or very close to 0.

Whether the touch sensor is in an activated state or a deactivated state may be determined based on a power consumption amount of the touch sensor. For instance, if a power consumption amount of the touch sensor is equal to or less than a preset value based on '0', it may be determined that the touch sensor is in a deactivated state. Further, if a power consumption amount of the touch sensor exceeds the preset value based on '0', it may be determined that the touch sensor is in an activated state.

If the display unit 151 is in an activated state (hereinafter, will be referred to as an active mode), the touch sensor may wait for input of taps onto the display unit 151, while maintaining an activated state. Further, if the display unit 151 is in a deactivated state (hereinafter, will be referred to as a doze mode), the touch sensor may be activated at preset periods.

When the preset activation period of the touch sensor is shorter, a sensing speed with respect to taps applied onto the display unit 151 is higher. However, in this instance, a power consumption amount of the touch sensor may be increased. Further, when the preset activation period of the touch sensor is longer, a sensing speed with respect to taps applied onto the display unit 151 may be lower, while a power consumption amount of the touch sensor is decreased.

Thus, the preset period may be set so that a sensing speed with respect to taps applied onto the display unit 151 can be high enough not to be recognized by a user, and so that power consumption can be reduced. For instance, the preset period may be set so that the touch sensor in a deactivated state can be activated about 20 times (1 Hz) per second.

While the display unit 151 is in an activated state, the touch sensor may be also in an activated state. In an activated state, the touch sensor may have an activation period (T) of '0' or a value very close to '0'. Alternatively, in an activated state, the touch sensor may have an activation period (T) much shorter than that set in a deactivated state of the display unit 151, by several times. That is, the touch sensor may be activated with a different period, according to whether the display unit 151 is in an activated state or a deactivated state.

In a doze mode where the display unit 151 is in a deactivated state and the touch sensor is periodically activated, if a preset touch input (first and second touch inputs consecutively applied onto a predetermined region within a reference time, e.g., a 'KNOCK-KNOCK' touch input) is sensed by the touch sensor, the controller 180 can convert the doze mode into an activate mode where the display unit and the touch sensor are activated.

Moreover, the touch sensor may be driven at a different period according to a state of the display unit 151. For instance, the touch sensor may execute a doze mode when the display unit 151 is in a closed state, and execute an active mode when the display unit 151 is converted from a closed state to an open state.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A communication system which is operable with the variously described mobile terminal 100 will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database. A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter. In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

When the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this instance, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Figure 2:
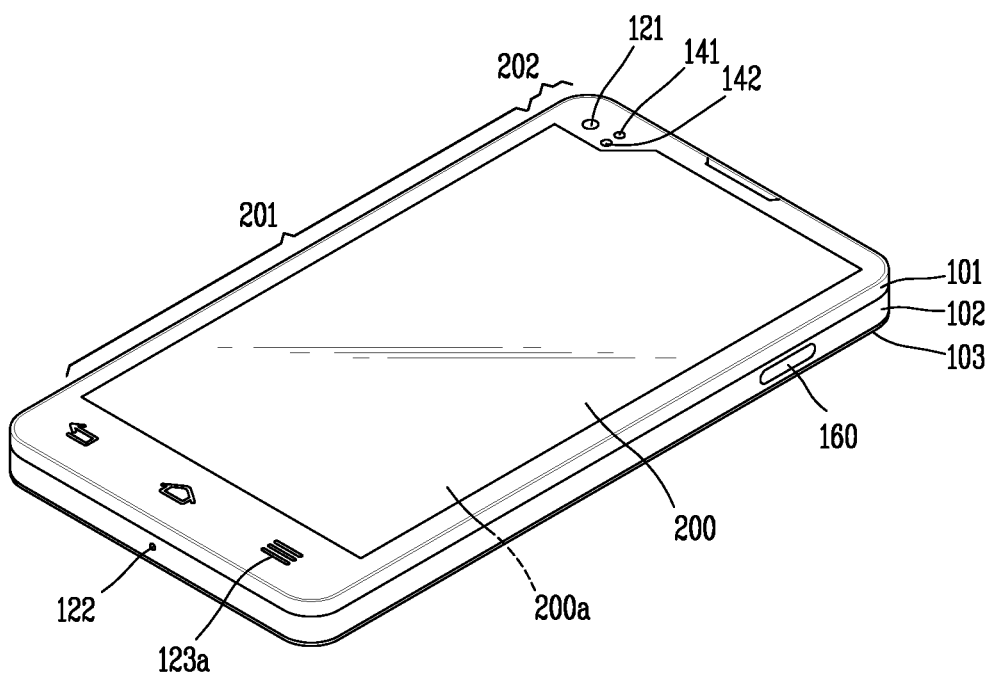
FIG. 2 is a conceptual view illustrating an example of the mobile terminal viewed from the front according to the embodiment.

FIG. 2 is a conceptual view illustrating an example of the mobile terminal viewed from the front according to the embodiment. As shown in FIG. 2, the mobile terminal according to the embodiment includes at least one display area independently activated (driven) in one display unit (or display panel) 200, thereby forming a window 200a. The display unit 200 has a different structure from the display unit 151 of which all areas are simultaneously activated/non-activated in terms that a partial area is independently activated/non-activated.

That is, the display unit 200 according to the embodiment has a structure in which one side of the display unit 151 shown in FIG. 1B extends in a predetermined direction, e.g., an upper direction. In FIG. 2, only the example in which one side of the display unit extends in the upper direction has been disclosed for convenience of illustration. However, the present disclosure is not limited thereto, and one side of the display unit may extend in a left, right, or lower direction.

In the display unit 200, a first area 201 as a main area corresponds to the display unit 151 of FIG. 1B, and a second area 202 corresponds to an extension area. The two areas 201 and 202 may be independently controlled by the controller 180. The extension area 202 has different shape and size from the main area 201. Thus, in the present disclosure, one of the two areas 201 and 202 is selectively activated if necessary, thereby reducing power consumption.

General image information may be displayed in the main area 201, and the occurrence of an event or a status bar may be displayed in the extension area 202. Also, additional information may be displayed in the extension area 202 according to the type of an application displayed in the main area 201. Particularly, when the main area 201 is in a non-activated state (off state), status information may be displayed in the extension area 202. When the main area 201 is in an activated state (on state), the status information is displayed at an upper portion of the main area 201.

Thus, the main area 201 is non-activated when a user does not use the mobile terminal, and when the extension area 202 is controlled to be activated, the user can identify a status of the mobile terminal or a newly occurring event through the extension area 202.

The extension area 202, as shown in this figure, may be formed to have a lateral or longitudinal length smaller than or equal to that of the main area 201. In the present disclosure, the case where the lateral length of the extension area 202 is smaller than that of the main area 201 will be described as an example. In this instance, the camera 121, the proximity sensor 141, and the illumination sensor 142, which are located at the upper bezel of the display unit 151 in FIG. 1B, may be disposed at a left side of the extension area 202 as shown in FIG. 2.

When the lateral length of the extension area 202 is formed smaller than that of the main area 201, at least one side of the extension area 201 may be formed as one of a straight line, an inclined surface, and a curved surface. In FIG. 3, the one side of the extension area 202 forms an inclined surface.

The display unit 200 as a display panel is generally divided into a liquid crystal panel and a backlight unit. The backlight unit uniformly provides light emitted from a light source in the front direction of the display unit 200, and includes a light source, a light guide plate, a polarizing plate, a diffusion plate, and a reflection plate.

Figure 3A:
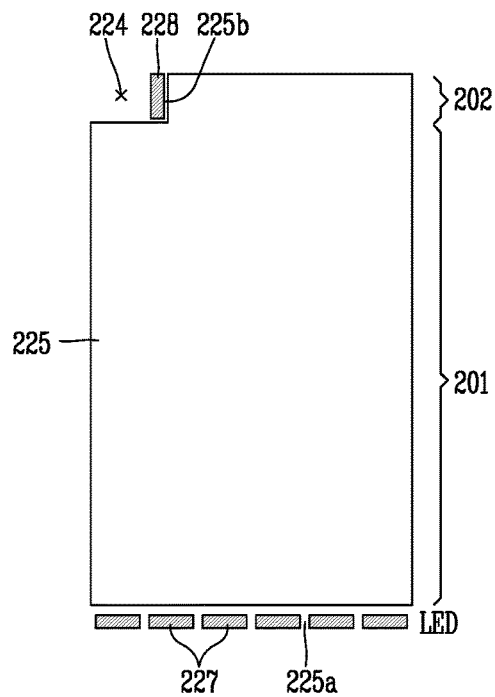
FIGS. 3A and 3B are front views illustrating a light guide plate and light sources, which constitute a display unit in the mobile terminal according to the embodiment.
Figure 3B:
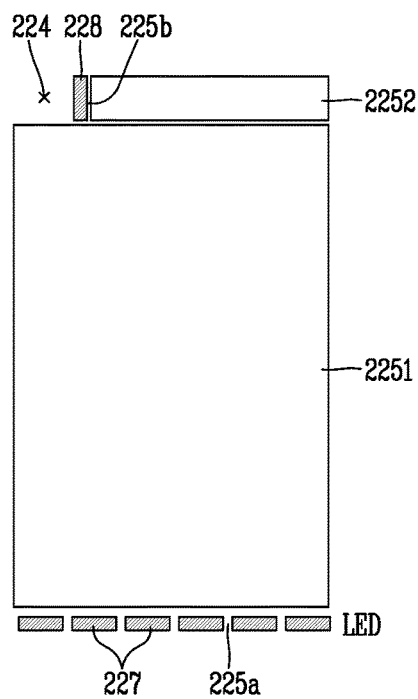

FIGS. 3A and 3B are front views illustrating a light guide plate and light sources, which constitute the display unit 200 in the mobile terminal according to the embodiment. As shown in FIG. 3A, light sources 227 and 228 are disposed at sides of a light guide plate 225 to supply light to the sides of the light guide plate 225, and the light guide plate 225 diffuses the light supplied from the light sources 227 and 228 by using total reflection in the light guide plate 225. The total reflection refers to a phenomenon in which light is emitted from the light guide plate 225 only when the light is incident within a critical angle. When light incident at the critical angle or more through a side of the light guide plate 225 is totally reflected and diffused inside the light guide plate 225 and then curved at an angle within the critical angle, the light is emitted from the light guide plate 225. In FIG. 3A, the main and auxiliary light sources 227 and 228 and the light guide plate 225 are illustrated.

Unlike the conventional art, the backlight unit of the present disclosure supplies light to the light guide plate 225 through light sources located in two directions. For example, a plurality of main light sources 227 arranged in parallel along a first side 225a may uniformly supply light to the whole of the light guide plate 225. The auxiliary light source 228 located at a second side 225b perpendicular to the first side 225a of the light guide plate 225 may supply light to a portion of the light guide plate 225.

The main light source 227 and the auxiliary light source 228 are independently driven, so that it is possible to control only the auxiliary light source 228 to be turned on in a state in the main light source 227 is turned off.

Figure 4:
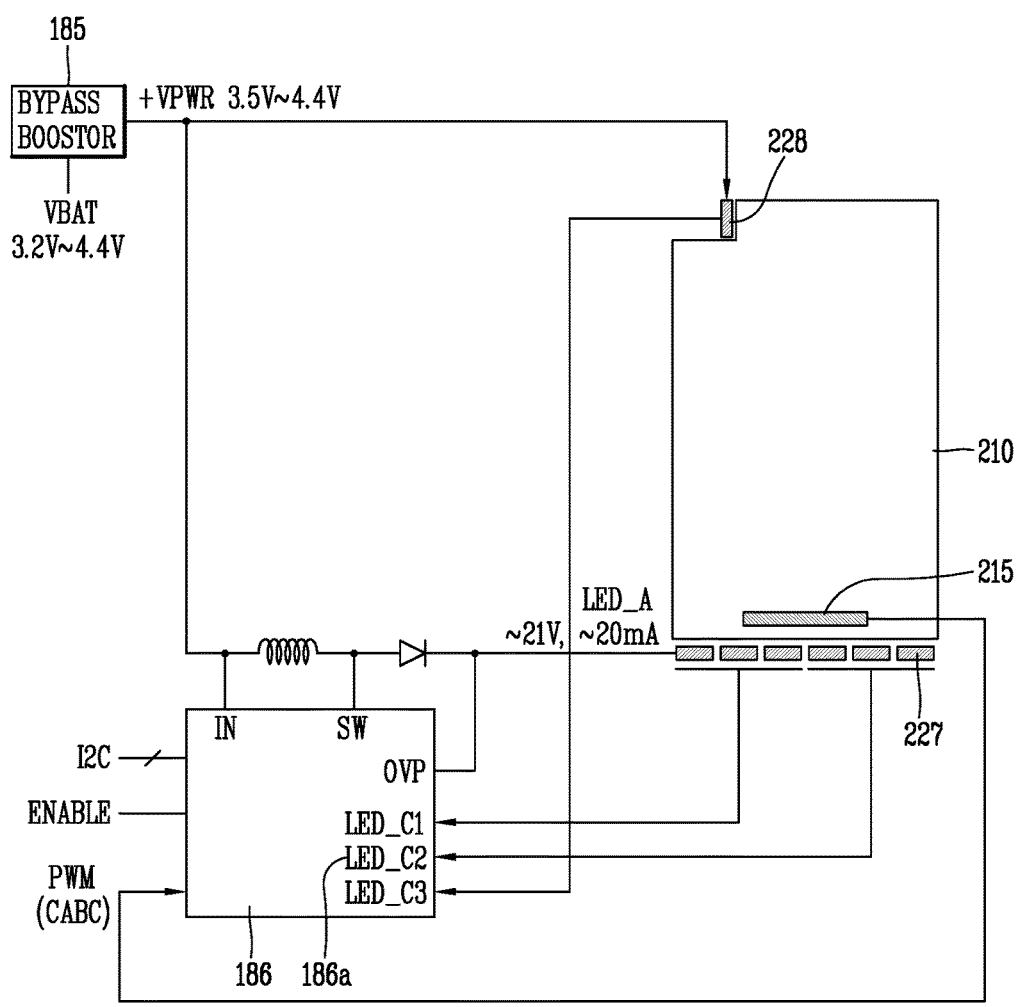
FIGS. 4 and 5 illustrate IC circuits for controlling main and auxiliary light sources.
Figure 5:
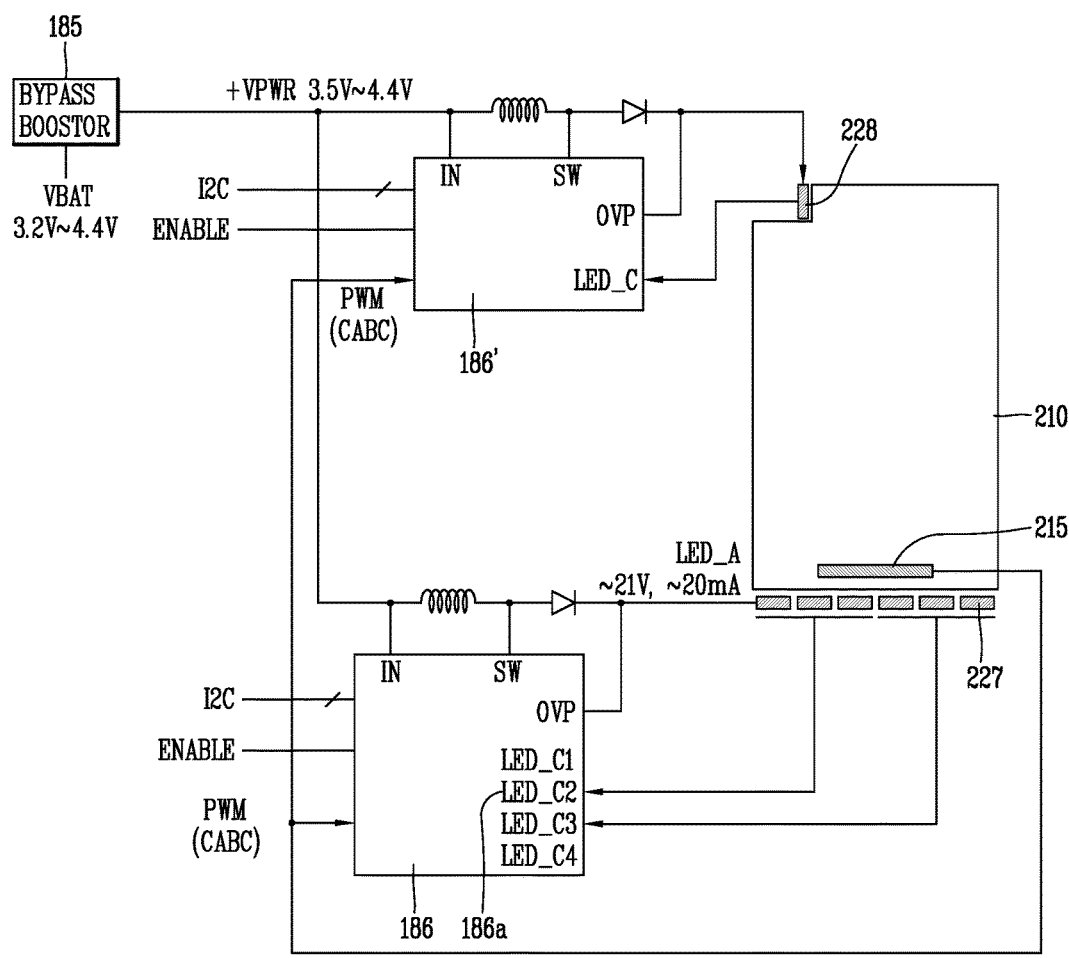

FIGS. 4 and 5 illustrate IC circuits for controlling the main light source 227 and the auxiliary light source 228. In the IC circuit shown in FIG. 4, one backlight IC 186 controls the main light source 227 and the auxiliary light source 228.

In the IC circuit shown in FIG. 5, two backlight ICs 186 and 186' control the main light source 227 and the auxiliary light source 228, respectively.

A voltage VBAT supplied from the power supply unit 190 has noise removed therefrom through a bypass booster 185 to be input to the backlight IC 186. The backlight IC 186 controls light to be emitted from the light sources 227 and 228. The backlight IC 186 detects an optimum backlight brightness for displaying an image, based on information of row data of the image, received from a drive IC 215 of the liquid crystal panel, thereby adjusting the brightness of each LED (content adaptive brightness control (CABC)).

In the present disclosure, when one backlight IC 186 is used, the auxiliary light source 228 may also be controlled by additionally using one LED channel 186a (FIG. 4). Alternatively, the auxiliary light source 228 may be controlled by using a separate backlight IC 186' (FIG. 5).

The main light source 227 is provided in plurality adjacent to the first side 225a to supply light to the whole of the light guide plate 225. Further, the auxiliary light source 228 is provided in about one or two smaller than the number of the main light sources 227 to supply light to only a portion of the light guide plate 225.

According to another embodiment, as shown in FIG. 3B, the display unit 200 of the present disclosure may include a first light guide plate 2251 for emitting light supplied from the main light source 227 toward the front of the display unit 200 and a second light guide plate 2252 for emitting light supplied from the auxiliary light source 228 toward the front of the display panel 200.

When the light guide plate 225 is of an integrated type as shown in FIG. 3A, the main light source 227 may supply light to not only the first area 201 and but also the second area 202. As a result, when the main light source 227 is turned on, it is unnecessary to turn on the auxiliary light source 228, and one image can be displayed through the second area 202 and the first area 201.

Meanwhile, when the light guide plate 225 is of a separate type as shown in FIG. 3B, light of the main light source 227 is supplied to only the first area 201 through the first light guide plate 2251, and light of the auxiliary light source 228 is supplied to only the second area 202 through the second light guide plate 2252. The auxiliary light source 228 is to be driven so as to display information in the second area 202 even in the state in which the main light source 227 is turned on. However, when information is displayed in only the second area 202, light is not supplied to the first area 201, and therefore, an image with high luminance may be provided by using a small number of light sources (LED lamps).

The main light source 227 and the auxiliary light source 228 may be integrated to be connected to a main board or individually connected to the main board. Therefore, in the present disclosure, that the main area 201 and the extension area 202 are independently controlled means that the controller 180 independently controls the main light source 227 and the auxiliary light source 228.

Since the auxiliary light source 228 is located at the second side 225b, the bezel at the second side 225b may increase. In the case of a display unit having a large size, the increase in the size of the bezel due to the auxiliary light source 228 may not be a serious problem as compared with the entire size of the display unit. However, in the case of a mobile terminal having a small size, the size of the bezel becomes a very important factor in determining the entire size of a product.

Thus, in the present disclosure, in order to prevent the increase in the size of the bezel, the second side 225 of the light guide plate 225, at which the auxiliary light source 228 is located, may be formed recessed, thereby forming a dent 224. The auxiliary light source 228 is located in the dent 224, so that it is possible to prevent the bezel from increasing in a side direction.

Meanwhile, a liquid crystal panel 210 constituting the display unit 200 of the present disclosure has a size similar to that of the light guide plate 225. That is, when the light guide plate 225 is provided with the dent 224, a dent is formed at the same position of the liquid crystal panel.

In the present disclosure, the light guide plate 225 may be divided into a portion corresponding to the main area 201 and a portion corresponding to the extension area 202. However, the liquid crystal panel is formed in a single body and controlled by a drive IC. The drive IC is connected to the main board through a flexible board to apply a voltage for each pixel according to a received image signal, thereby adjusting the arrangement of liquid crystals.

The liquid crystal panel is a device in which the arrangement of liquid crystals is changed by selectively applying a voltage for each pixel, so that different colors are output for the respective pixels, thereby displaying an image. The display unit 200 including the liquid crystal panel and the backlight unit, as shown in FIG. 2, is disposed at the front of the mobile terminal 100, so that information can be output under control of the controller 180 of the mobile terminal 100.

Figure 6:
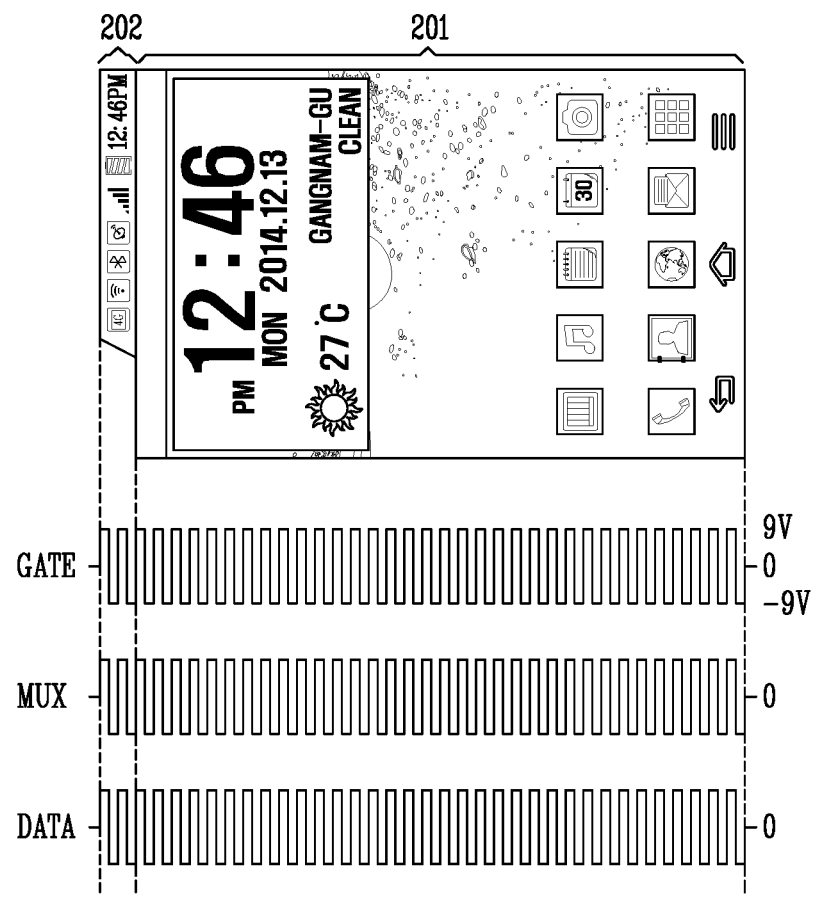
FIGS. 6 and 7 are views illustrating waveforms of signals applied to a liquid crystal panel of the mobile terminal according to the embodiment.
Figure 7:
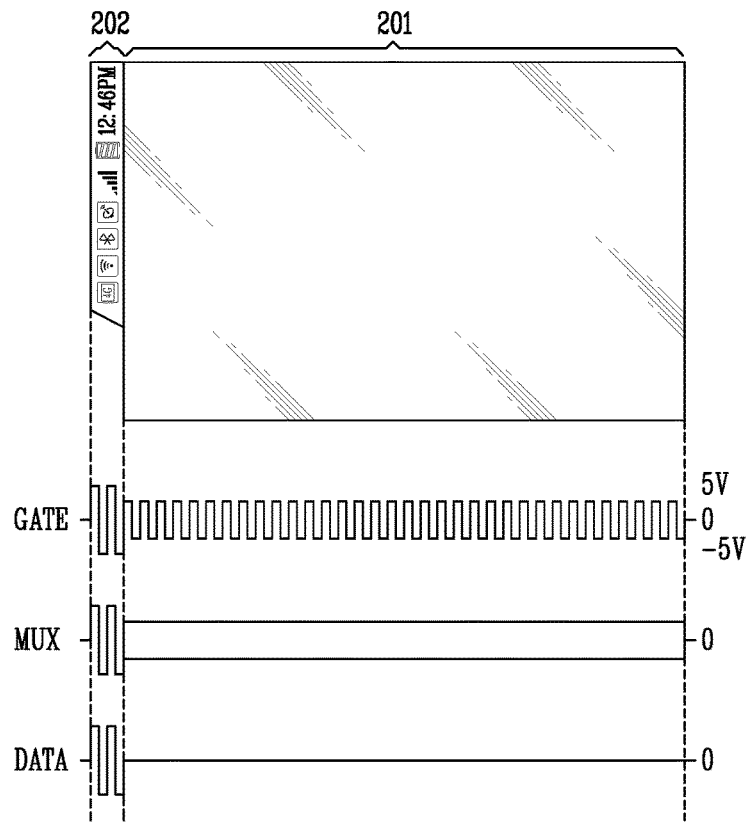

FIGS. 6 and 7 are views illustrating waveforms of signals applied to the liquid crystal panel of the mobile terminal according to the embodiment. In the present disclosure, an operation mode may be defined according to a type in which the main area 201 and the extension area 202 are driven. A first mode is a mode in which the entire screen, i.e., both the main and extension areas 201 and 202 are activated, and a second mode is a mode in which only the extension area 202 is activated.

As shown in FIG. 6, in the first mode, the drive IC transmits a gate signal GATE, a multiplexer signal MUX, and a data signal DATA to the liquid crystal panel so as to activate both the main and extension areas 201 and 202. The gate signal functions to determine a threshold voltage of a thin film transistor FET in each pixel. Thus, an image can be output by changing the arrangement of liquid crystals only when a data voltage equal to or greater than a voltage applied to a gate of the thin film transistor is applied.

A multiplexer is disposed between the drive IC and each transistor. A gate signal GATE and a data signal DATA are transmitted through the multiplexer, and the transmitted signals GATE and DTAT are sequentially redistributed to be supplied to each transistor. The gate signal includes a gate clock and a shift-resistor, and the shift-resistor performs an operation of receiving clock and transmitting the received clock to a next gate.

The data signal is a signal for driving the liquid crystal panel according to color information for each pixel, and a voltage greater than that of the gate signal is applied at a portion where the arrangement of the liquid crystals is to be changed, so that light supplied from the backlight unit can pass through the liquid crystal panel in the front direction of the display unit.

Meanwhile, as shown in FIG. 7, in second mode, the drive IC transmits, to the liquid crystal panel, only a gate signal GATE, a multiplexer signal MUX, and a data signal DATA, corresponding to the extension area 202, so as to activate the extension area 202. The gate signal GATE is to be applied for a predetermined period for the purpose of synchronization. However, since the data signal is not applied to the main area 201, the magnitude of the gate signal may be set to be small. For example, a gate signal of ±9V may be used in the extension area 202 in which the arrangement of the liquid crystals is changed depending on a data signal, and a gate signal of ±5V may be used in the main area 201.

The present disclosure can provide a plan for enabling contents displayed in the main area (screen) and the extension area (screen) of the display unit 200 to be linked with each other by selectively activating the main and extension areas in the non-activated state (off state) through a touch input.

The touch input is a touch where a predetermined area is continuously tapped within a reference time. In the present disclosure, the touch input is referred to as a knock code. The knock code is a dedicated code for activating the main area and the extension area.

A user can activate the main area and the extension area by applying a predetermined touch input (e.g., a short touch input) before a knock code is input. If a knock code is input, the controller 180 can turn on a liquid crystal panel (e.g., an LCD) of the area (main area or extension area) activated by the input knock code and simultaneously release screen lock by comparing the input knock code with a previously set knock code.

Hereinafter, embodiments related to a control method which can be implemented in the mobile terminal configured as described above will be described with reference to the accompanying drawings. It will be apparent by those skilled in the art that the present disclosure may be embodied in other specific forms without departing from the spirit or essential characteristics thereof.

In the following embodiments, the main area 201 will be referred to as a 'first area,' and the extension area 202 formed to extend at least one direction of the main area 201 will be referred to as a 'second area.'

Figure 8:
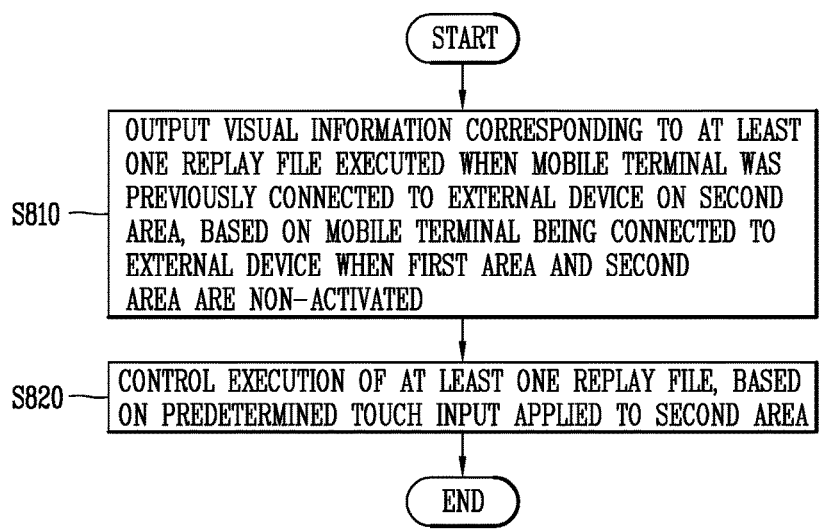
FIG. 8 is a flowchart illustrating a control method of the mobile terminal according to the embodiment.

FIG. 8 is a flowchart illustrating a control method of the mobile terminal according to the embodiment. Referring to FIG. 8, visual information corresponding to at least one replay file which was executed when the mobile terminal was previously connected to an external device is output to a second area 202 formed to extend in at least one direction of a first area 201, based on that the mobile terminal is connected to the external device when the first area 201 and the second area 202 are non-activated (S810).

The non-activated state refers to when at least one portion of the display unit 200 is in an off state, and the external device refers to a device capable of transmitting/receiving signals to/from the wireless communication unit 110 of the mobile terminal 100. As an embodiment, a short-range communication technology including Bluetooth™, Radio Frequency IDentification (RFID), Infrared Data Association (IrDA), Ultra WideBand (UWB), ZigBee, Near Field Communication (NFC), Wireless Universal Serial Bus (Wireless USB), and the like may be applied between the external device and the mobile terminal 100.

Also, the external device may include mobile terminals such as a cellular phone, a smart phone, a laptop computer, a terminal for digital broadcast, a Personal Digital Assistant (PDA), a Portable Multimedia Player (PMP), a navigation, a slate PC, a tablet PC, an ultrabook, and a wearable device (e.g., a smart watch, a smart glass, or a Head Mounted Display (HMD)).

As another embodiment, the external device may also include fixed terminals such as a digital TV, a desktop computer, and a digital signage. As still another embodiment, the external device may include an in-vehicle device capable of communicating with the mobile terminal 100 through Bluetooth™, etc. The in-vehicle device may be implemented as a navigation, an integrated image display device, a vehicle control device, etc.

The replay file refers to a file which can be replayed, such as a moving image file or a sound file. The visual information corresponding to a replay file may include an icon corresponding to the replay file, a text in which the name of the replay file is described, and the like.

As a specific embodiment, in step S810, if the mobile terminal 100 is connected to an in-vehicle device through Bluetooth™, etc., an icon corresponding to a music replay list including a plurality of music replay files may be output in the second area 202 which was in the non-activated state. The music replay list refers to a music replay list which was executed when the mobile terminal 100 was connected to the in-vehicle device before the current connection (this connection).

Subsequently, the execution of at least one replay file is controlled based on that a predetermined touch input is applied to the second area 202 (S820). As an embodiment, if a touch input is applied to the icon corresponding to the music replay list output in the second area 202, a music replay file included in the music replay list can be replayed.

Hereinafter, specific embodiments will be described. As an embodiment, step S810 may include outputting, in the second area 202, an icon corresponding to a first replay list including at least one replay file which was executed when the mobile terminal 100 was previously connected to the external device, based on that the mobile terminal 100 is connected to the external device in the state in which the first area 201 and the second area 202 are non-activated.

As another embodiment, step S820 may include executing at least one replay file included in the first replay list, based on a predetermined touch input being applied to the icon corresponding to the first replay list. As still another embodiment, step S820 may include outputting, in the second area 202, visual information corresponding to a currently executed replay file among the at least one replay file included in the first replay list.

As still another embodiment, step S820 may include executing at least one replay file included in the first replay list by applying a volume value set when the mobile terminal 100 was previously connected to the external device. As still another embodiment, step S820 may include outputting an icon corresponding to a second replay list including at least one replay file which was executed before the mobile terminal 100 is currently connected to the external device, based on a predetermined touch input being applied to the icon corresponding to the first replay list, and executing at least one replay file included in the second replay list, based on a predetermined touch input being applied to the icon corresponding to the second replay list.

As still another embodiment, step S820 may include outputting an icon corresponding to a third replay list including at least one previously set replay file, based on a predetermined touch input being applied to the icon corresponding to the first replay list, and executing at least one replay file included in the third replay list, based on a predetermined touch input being applied to the icon corresponding to the third replay list.

As still another embodiment, step S810 may include outputting, in the first area 201, the first replay list including the at least one replay file which was executed when the mobile terminal 100 was previously connected to the external device, based on a predetermined touch input being applied to the icon corresponding to the a first replay file.

As still another embodiment, step S810 and step S820 may include deleting first replay file from the first replay list or executing the first replay file, based on that a predetermined touch input is applied to an icon corresponding to the first replay file including the first replay list. As still another embodiment, the control method may further include outputting, in the second area 202, visual information corresponding to at least one replay file which was executed when the mobile terminal 100 was previously connected to a first external device different from the external device, based on that the mobile terminal 100 is connected to the first external device, and controlling the execution of the at least one replay file, based on a predetermined touch input is applied to the second area 202.

Meanwhile, the controller 180 can output, in the second area 202, the icon corresponding to the first replay list including at least one replay file which was executed when the mobile terminal 100 was previously connected to the external device, based on that the mobile terminal 100 is connected to the external device in the state in which the first area 201 and the second area 202 are non-activated.

Subsequently, the controller 180 can execute at least one replay file included in the first replay list, based on a predetermined touch input being applied to the icon corresponding to the first replay list. In this instance, the controller 180 can output, in the second area 202, visual information corresponding to a currently executed replay file among the at least one replay file included in the first replay list. Also, the controller 180 can execute at least one replay file included in the first replay list by applying a volume value set when the mobile terminal 100 was previously connected to the external device.

Figure 9:
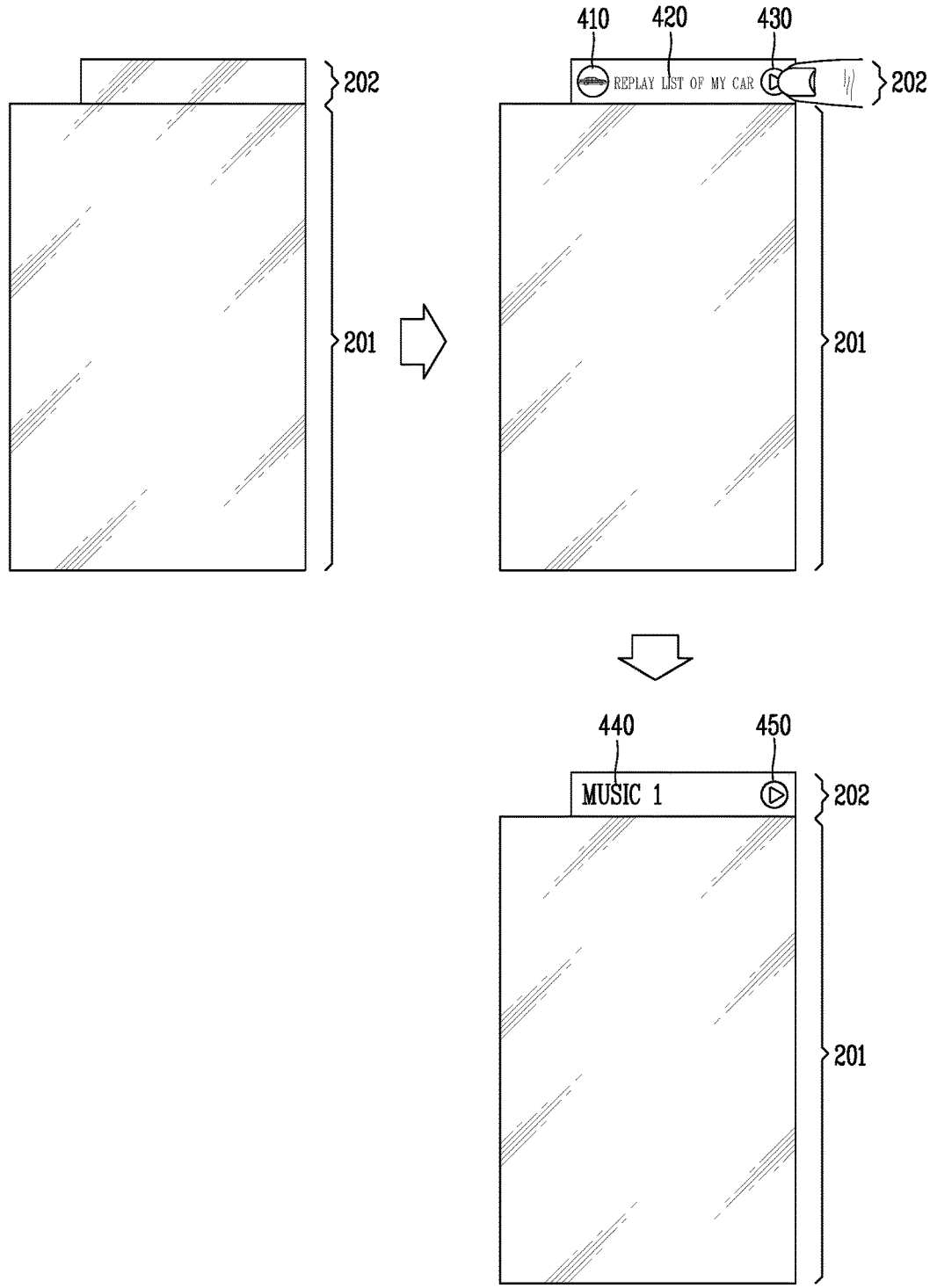
FIG. 9 is a conceptual view illustrating an embodiment in which a replay list executed when the mobile terminal was previously connected to a Bluetooth device of a vehicle is output.

FIG. 9 is a conceptual view illustrating an embodiment in which a replay list executed when the mobile terminal was previously connected to a Bluetooth device of a vehicle is output. Referring to FIG. 9, when the mobile terminal is connected to the Bluetooth device of the vehicle when the first area 201 and the second area 202 are non-activated, visual information 410, 420, and 430 corresponding to a replay list including a plurality of music replay files which were replayed when the mobile terminal was previously connected to the Bluetooth device is output in the second area 202.

As an embodiment, a vehicle icon 410 representing the connected Bluetooth device, a name 420 of the replay list, and a replay icon 430 for executing the replay list can be output in the second area 202. Subsequently, if a user applies a touch input to the replay icon 430, one of the plurality of music replay files included in the replay list can be replayed. Accordingly, the state of the second area 202 is switched to the activated state, and a name 440 of a music replay file being replayed, an icon 450 capable of controlling a replay status of the music replay file, and the like can be output in the second area 202.

As an embodiment, if a touch input is applied to the replay icon 430, a plurality of music replay files can be replayed in an order where they were replayed when the mobile terminal was previously connected to the Bluetooth device. In this instance, the plurality of music replay files can be replayed with a volume equal to that with which they were replayed when the mobile terminal was previously connected to the Bluetooth device.

As another embodiment, if a touch input is applied to the replay icon 430, the plurality of music replay files replayed when the mobile terminal was previously connected to the Bluetooth device can be replayed in an arbitrary order.

Further, the controller 180 can output an icon corresponding to the second replay list including at least one replay file which was executed when the mobile terminal is currently connected to the external device, based on that a predetermined touch input to the icon corresponding to the first replay list, and execute at least one replay file included in the second replay list, based on a predetermined touch input being applied to the icon corresponding to the second replay list.

Figure 10:
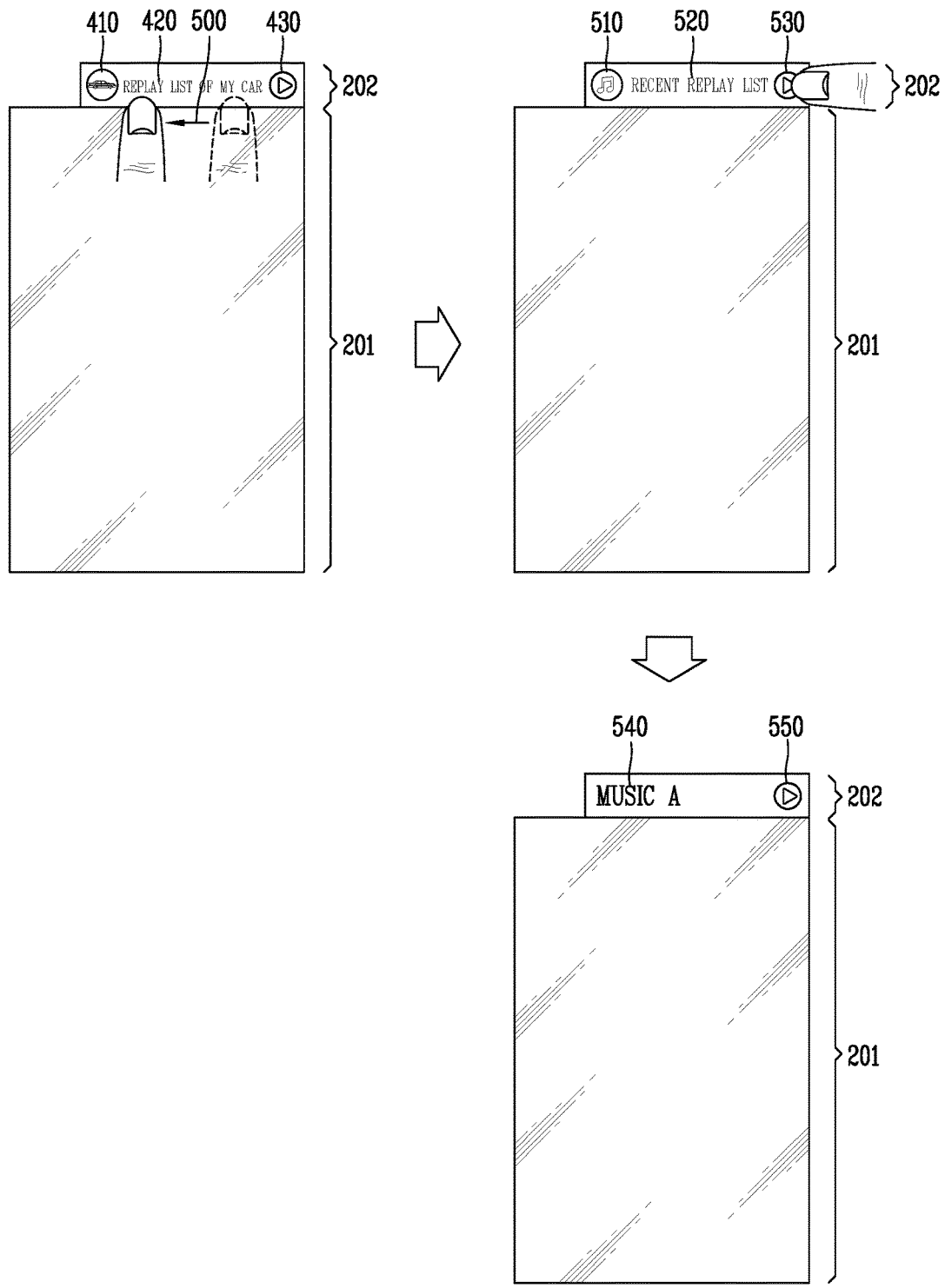
FIG. 10 is a conceptual view illustrating an embodiment in which a recent replay list is output.

Next, FIG. 10 is a conceptual view illustrating an embodiment in which a recent replay list is output. Referring to FIG. 10, as described in FIG. 9, when the mobile terminal is connected to the Bluetooth device of the vehicle when the first area 201 and the second area 202 are non-activated, visual information 410, 420, and 430 corresponding to a replay list including a plurality of music replay files which were replayed when the mobile terminal was previously connected to the Bluetooth device can be output in the second area 202.

As an embodiment, a vehicle icon 410 representing the connected Bluetooth device, a name 420 of the replay list, and a replay icon 430 for executing the replay list can be output in the second area 202. Subsequently, if the user applies, to the second area 201, a flicking input 500 to the left side, visual information 510, 520, and 530 corresponding to a replay list including a plurality of music replay files which have been most recently replayed before the mobile terminal is connected to the Bluetooth device can be output in the second area 202.

As an embodiment, an icon 510 representing a music replay list which has been most recently executed, a name of the recent replay list, and a replay icon 530 for executing the recent replay list can be output in the second area 202. Subsequently, if the user applies a touch input to the replay icon 530, one of the plurality of music replay files including the recent replay list can be replayed. Therefore, a name 540 of the music replay file being replayed, an icon 550 capable of controlling a replay status of the music replay file, and the like can be output in the second area 202.

As an embodiment, if a touch input is applied to the replay icon 530, a plurality of music replay files can be replayed in an order where they were sequentially replayed from a music replay file which has been most recently replayed. In this instance, the plurality of music replay files can be replayed with a volume equal to that with which the music replay file has been most recently replayed.

As another embodiment, if a touch input is applied to the replay icon 530, a plurality of music replay files which have been most recently replayed can be replayed in an arbitrary order. As still another embodiment, when a music replay file was being replayed before the mobile terminal is connected to the Bluetooth device, the same music replay file may be subsequently replayed.

Specifically, if a touch input is applied to the replay icon 530, music replay file A being replayed when the mobile terminal is connected to the Bluetooth device may be again replayed. In this instance, the music replay file A can be replayed with a volume equal to that with which the music replay file A was previously replayed. Subsequently, next music replay files in a replay list including the music replay file A can be replayed.

Meanwhile, the controller 180 can output an icon corresponding to the third replay list including at least one previously set replay file, based on a predetermined touch input being applied to the icon corresponding to the first replay list, and execute at least one replay file included in the third replay list, based on a predetermined touch input is applied to the icon corresponding to the third replay list.

Figure 11:
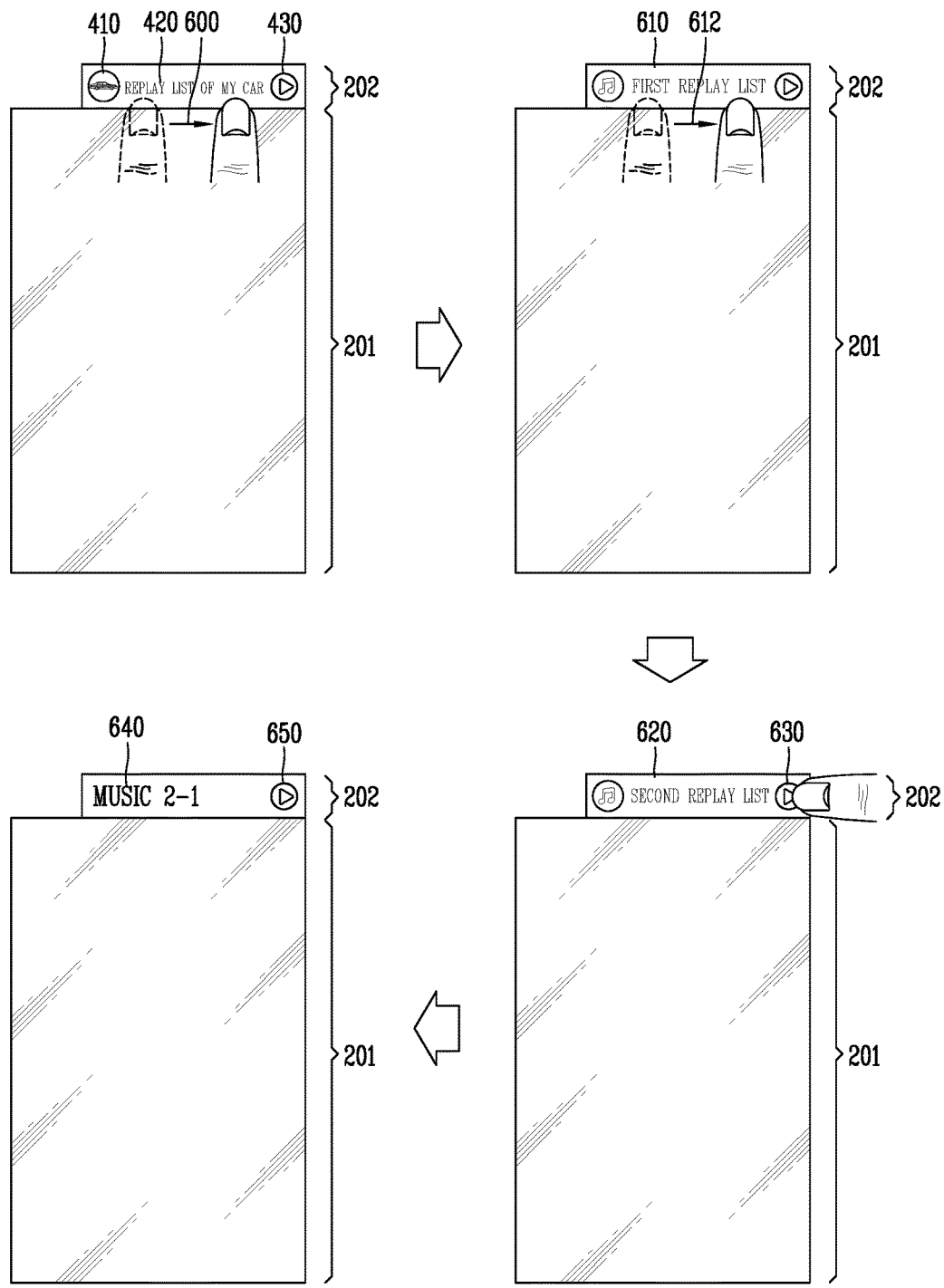
FIG. 11 is a conceptual view illustrating an embodiment in which a previously set replay list is output.

FIG. 11 is a conceptual view illustrating an embodiment in which a previously set replay list is output. Referring to FIG. 11, as described in FIG. 9, when the mobile terminal is connected to the Bluetooth device of the vehicle when the first area 201 and the second area 202 are non-activated, visual information 410, 420, and 430 corresponding to a replay list including a plurality of music replay files which were replayed when the mobile terminal was previously connected to the Bluetooth device can be output in the second area 202.

As an embodiment, a vehicle icon 410 representing the connected Bluetooth device, a name 420 of the replay list, and a replay icon 430 for executing the replay list can be output in the second area 202. Subsequently, if the user applies, to the second area 202, a flicking input 600 to the right side, visual information 610 corresponding to a previously set first replay list can be output in the second area 202. For example, a name 610 of a replay list to which the user frequently listened can be output in the second area 202.

After that, if the user again applies, to the second area 202, a flicking input 612 to the right side, visual information corresponding to a previously set second replay list can be output in the second area 202. For example, a name 620 of a replay list to which the user frequently listened next to the first replay list can be output in the second area 202.

As another embodiment, the replay lists 610 and 620 output according to the consecutive flicking inputs 600 and 612 may be previously set by the user. Alternatively, as described above, the replay lists can be output in an order where the user frequently listened to the replay lists or in an order where the user has recently listened to the replay lists. Specifically, the first replay list may be a replay list to which the user has most recently listened, and the second replay list may be a replay list to which the user listened prior to the first replay list.

If a touch input is applied to a replay icon 630 for executing the second replay list, one of a plurality of music replay file included in the second replay list can be replayed. Therefore, a name 640 of a music replay file being replayed, an icon 650 capable of controlling a replay status of the music replay file, and the like can be output in the second area 202.

As an embodiment, if a touch input is applied to the replay icon 630, a plurality of music replay files can be replayed in an order where they are set in the second replay list. That is, music replay file 2-1 set as a first piece of music in the second replay list can be replayed. As another embodiment, a plurality of music replay files included in the second replay list can be replayed in an order where they were sequentially replayed from a music replay file which has been most recently replayed or in an arbitrary order.

Meanwhile, the controller 180 can output the first replay list in the first area 201, based on a predetermined touch input being applied to the icon corresponding to the first replay list. In this instance, the controller 180 can delete a first replay file from the first replay list or execute the first replay file, based on a predetermined touch input is applied to an icon corresponding to the first replay file included in the first replay list.

Figure 12:
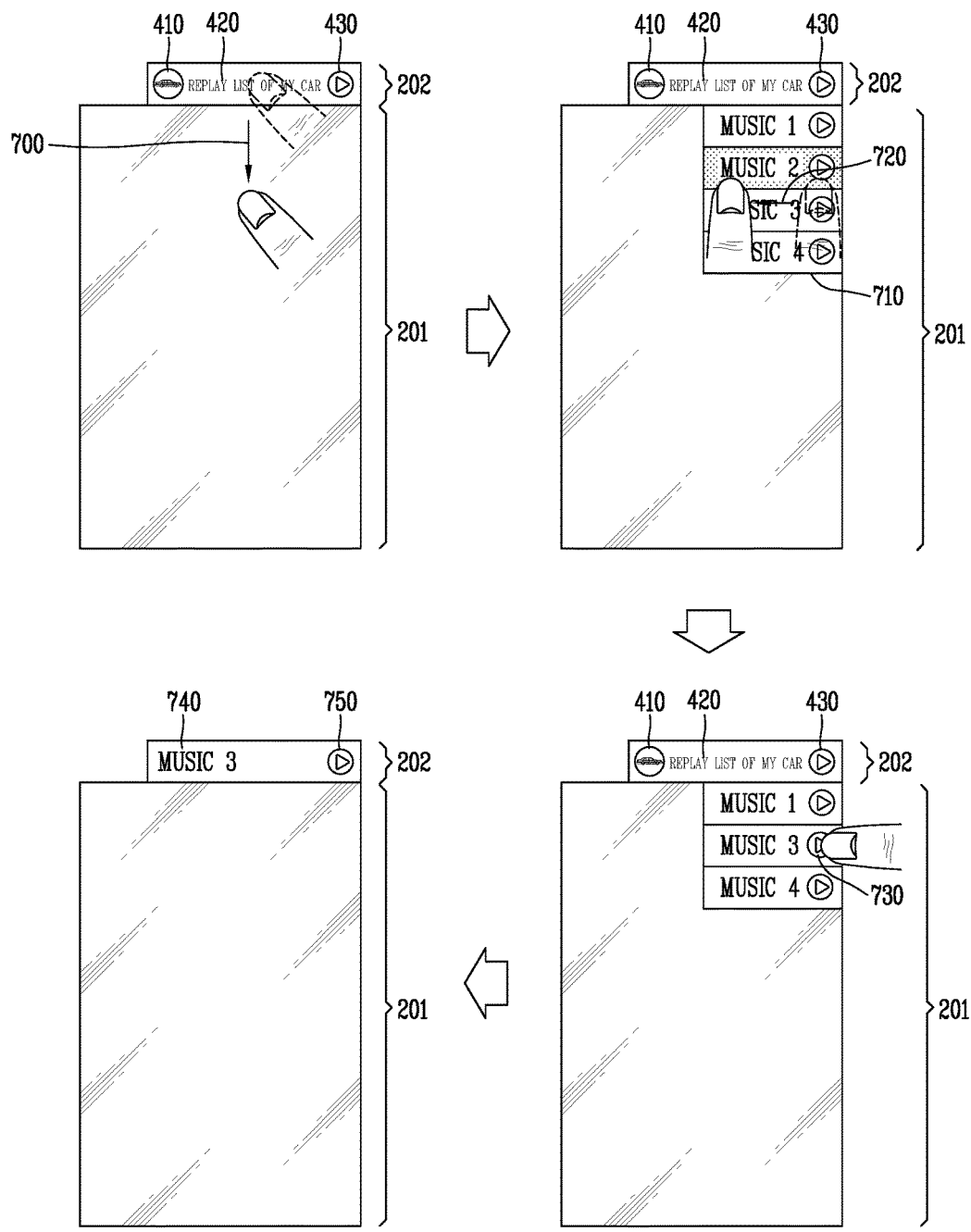
FIG. 12 is a conceptual view illustrating an embodiment in which replay files included in a replay list are edited.

FIG. 12 is a conceptual view illustrating an embodiment in which replay files included in a replay list are edited. Referring to FIG. 12, as described in FIG. 9, when the mobile terminal is connected to the Bluetooth device of the vehicle when the first area 201 and the second area 202 are non-activated, visual information 410, 420, and 430 corresponding to a replay list including a plurality of music replay files which were replayed when the mobile terminal was previously connected to the Bluetooth device can be output in the second area 202.

As an embodiment, a vehicle icon 410 representing the connected Bluetooth device, a name 420 of the replay list, and a replay icon 430 for executing the replay list can be output in the second area 202. Subsequently, if the user applies, to the second area 202, a flicking input to the first area 201, a list window 710 of a plurality of music replay files which were replayed when the mobile terminal was previously connected to the Bluetooth device may be spread in the first area 201 in the non-activated state. As an embodiment, names of a plurality of music replay files which were replayed when the mobile terminal was previously connected to the Bluetooth device can be output on the list window 710.

If a flicking input 720 to the left side is applied to a second music replay file as one music replay file among the plurality of music replay files, the second music replay file may be deleted from the list window 710. As another embodiment, if a touch input is applied to a replay icon 730 for replaying a third music replay file, the third music replay file can be replayed. Therefore, a name 740 of the third music replay file being replayed, an icon 750 capable of controlling a replay status of the third music replay file, and the like can be output in the second area 202.

That is, a plurality of music replay files which were replayed from the third music replay file before the mobile terminal is connected to the Bluetooth device can be replayed. According to the embodiment of FIG. 12, after the replay of the third music replay file is completed, a fourth music replay file can be replayed.

Meanwhile, the controller 180 can output visual information corresponding to at least one replay file which was executed when the mobile terminal is connected to a first external device, based on that the mobile terminal is connected to the first external device different from the external device, and control execution of the at least one replay file, based on that a predetermined touch input is applied to the second area 202.

Figure 13:
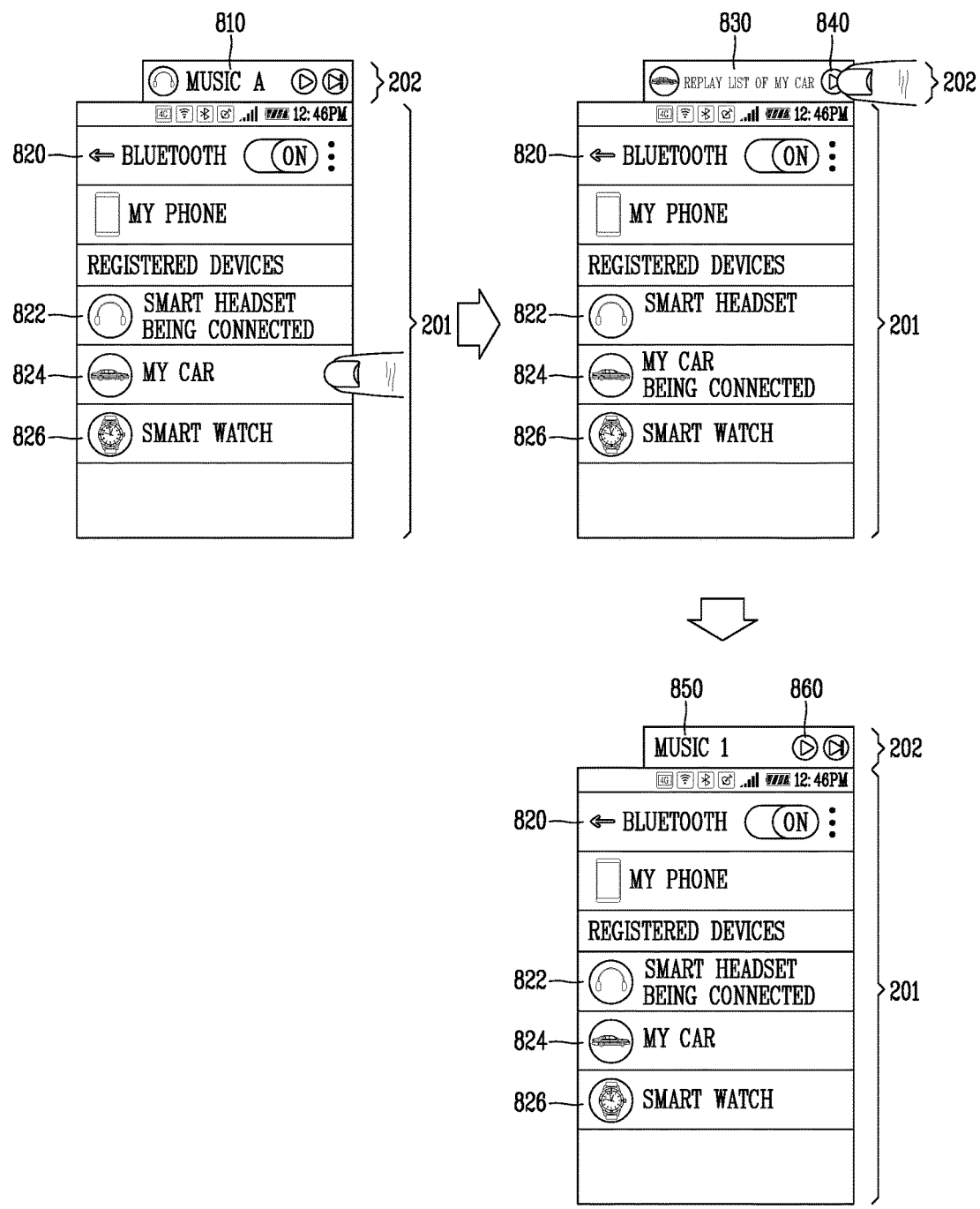
FIG. 13 is a conceptual view illustrating an embodiment of a user interface output when the mobile terminal is connected to another external device.

FIG. 13 is a conceptual view illustrating an embodiment of a user interface output when the mobile terminal is connected to another external device. Referring to FIG. 13, when the mobile terminal is being connected to a smart headset, and the user is listening to music file A (music replay file A), a name 810 of the music file A being replayed can be output in the second area 202.

Subsequently, the user can allow a screen for network connection setting to be output. As an embodiment, a screen 820 for Bluetooth connection setting can be output by a user input. In this instance, a list of registered devices which can be connected to the mobile terminal 100 through Bluetooth™ can be output on the screen 820 for Bluetooth connection setting. Specifically, the smart headset 822 being currently connected to the mobile terminal 100, a Bluetooth device 824 of the vehicle, a smart watch 826, and the like may be output.

Subsequently, if a touch input is applied to the Bluetooth device 824 of the vehicle, the mobile terminal 100 may be connected to the Bluetooth device. Also, a name 830 of a music file replay list including music files which were replayed when the mobile terminal 100 was previously connected to the Bluetooth device can be output in the second area 202.

After that, if the user applies a touch input to an icon 840 corresponding to the execution of the replay list, one of a plurality of music files included in the replay list can be replayed. Therefore, a name 850 of a music file being currently replayed, an icon 860 capable of controlling a replay status of the music file, and the like can be output in the second area 202.

As an embodiment, if a touch input is applied to the icon 840, a plurality of music files can be replayed in an order where they were replayed when the mobile terminal was previously connected to the Bluetooth device. In this instance, the plurality of music files can be replayed with a volume equal to that with which they were replayed when the mobile terminal was previously connected to the Bluetooth device.

As another embodiment, if a touch input is applied to the icon 840, the plurality of music files which were replayed when the mobile terminal was previously connected to the Bluetooth device may be in an arbitrary order.

Figure 14:
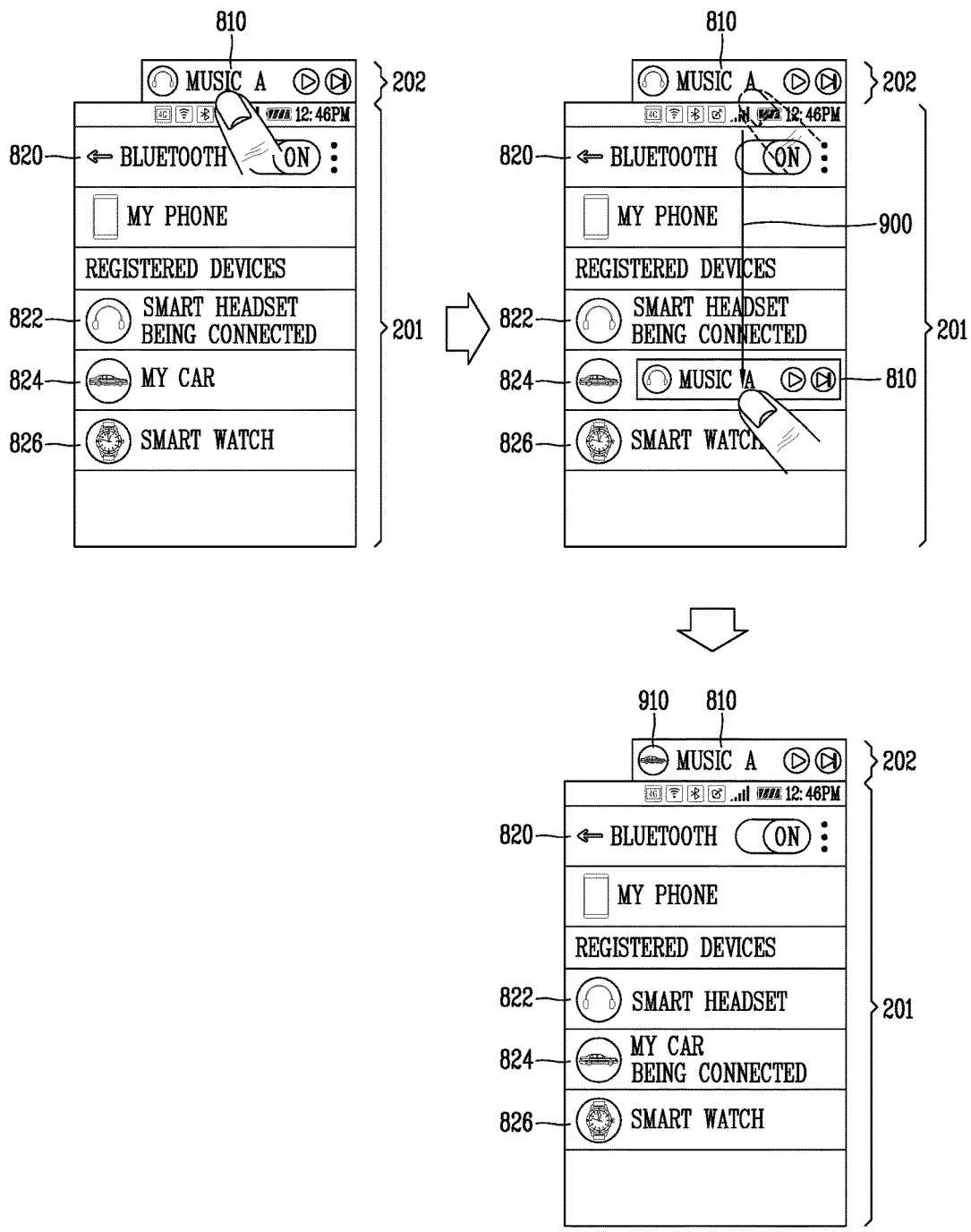
FIG. 14 is a conceptual view illustrating another embodiment of the user interface output when the mobile terminal is connected to another external device.

FIG. 14 is a conceptual view illustrating another embodiment of the user interface output when the mobile terminal is connected to another external device. Referring to FIG. 14, as described in FIG. 13, when the mobile terminal is being connected to a smart headset, and the user is listening to music file A (music replay file A), a name 810 of the music file A being replayed can be output in the second area 202.

Subsequently, the user can allow a screen for network connection setting to be output. As an embodiment, a screen 820 for Bluetooth connection setting can be output by a user input. In this instance, a list of registered devices which can be connected to the mobile terminal 100 through Bluetooth™ can be output on the screen 820 for Bluetooth connection setting. Specifically, the smart headset 822 being currently connected to the mobile terminal 100, a Bluetooth device 824 of the vehicle, a smart watch 826, and the like may be output.

Subsequently, the user can apply, to the second area 202, an input 900 for dragging the name 810 of the music file A being output to the Bluetooth device 824 of the vehicle. Accordingly, the mobile terminal 100 can be connected to the Bluetooth device.

When the mobile terminal 100 is connected to the Bluetooth device through the drag input 900, a music replay list to which the user is listening through the smart headset may be continuously replayed. Specifically, the music file A may be continuously replayed without any pause or after the drag input 900, and a music replay file including the music file A may be continuously replayed. Also, a vehicle icon 910 and the name 810 of the music file A being currently replayed can be output in the second area 202

Figure 15:
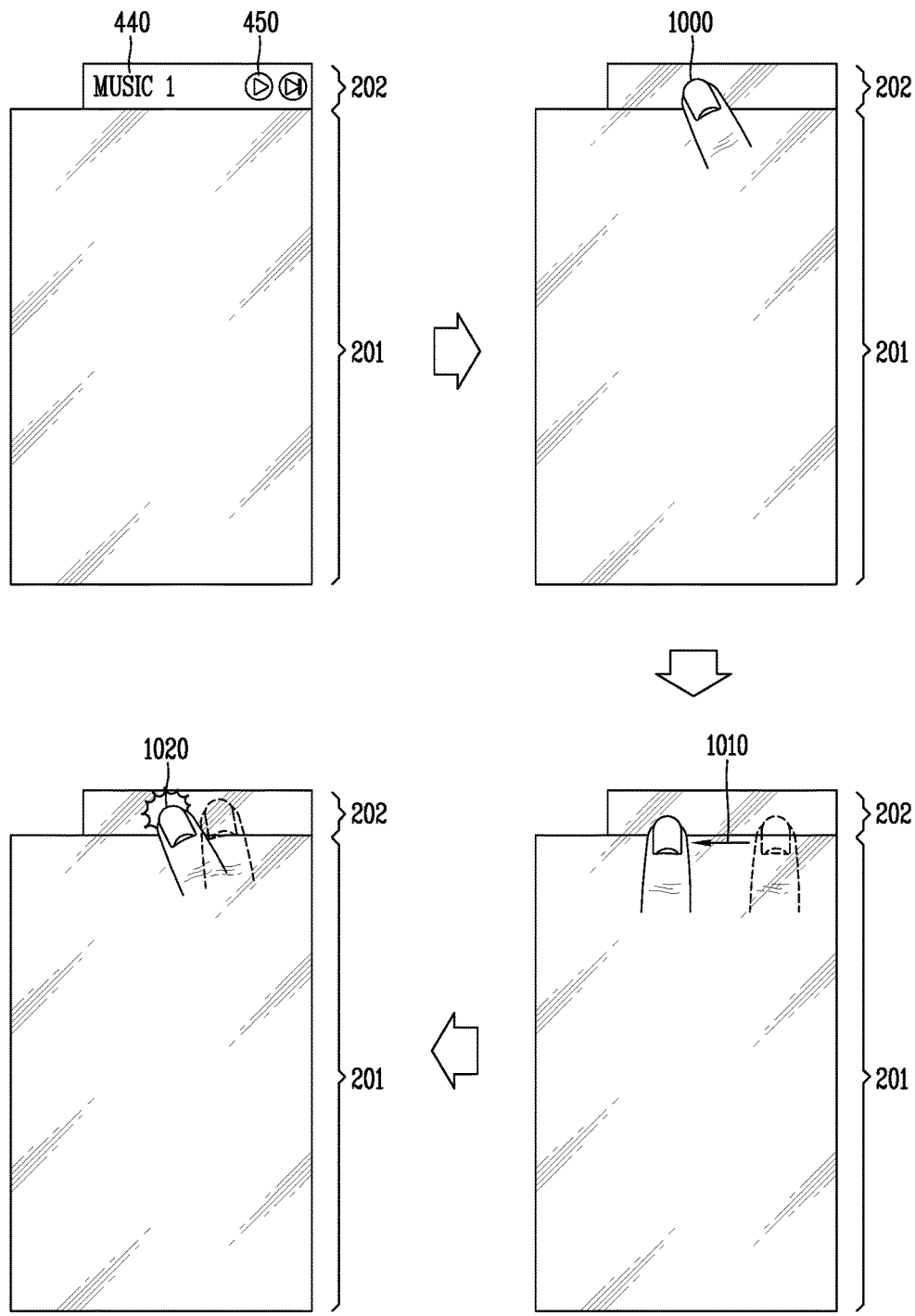
FIG. 15 is a conceptual view illustrating an embodiment in which the replay of a music file is controlled by entering into a music control mode.

FIG. 15 is a conceptual view illustrating an embodiment in which the replay of a music file is controlled by entering into a music control mode. Referring to FIG. 15, as described in FIG. 9, one of a plurality of music replay files included in a replay list can be replayed. Therefore, a name 440 of a first music replay file being replayed, an icon 450 capable of controlling a replay status of the first music replay file, and the like can be output in the second area 202.

Subsequently, when any user input is not applied for a predetermined time, the state of the second area 202 may be again switched to the non-activated state. In this instance, the first music replay file and the replay list including the first music replay file may be continuously replayed. Also, the user can control the replay status of a music replay file by applying a predetermined touch input to the second area 202 in the non-activated state.

As an embodiment, when a long touch input 1000 or tapping input is applied to the second area 202 in the non-activation state, the mobile terminal may enter into a control mode for controlling the replay status of a music replay file. In this instance, a notification sound or vibration for notifying that the mobile terminal has entered into the music control mode may be output.

Meanwhile, the mobile terminal may enter into the music control mode by applying a long touch input or tapping input to the second area 202 even when the second area 202 is not in the non-activated state. As an embodiment, the mobile terminal may enter into the music control mode by applying a long touch input or tapping input to the second area 202 in which the name 440 of the music replay file being replayed is output.

As another embodiment, when a swipe input 1010 to the left side is applied to the second area 202 in the non-activated state, a second music replay file which is a next one of the first music replay file can be replayed. In this instance, a vibration feedback can be output together with the replay of the second music replay file.

As still another embodiment, when a tapping input 1020 is applied to the second area 202 in the non-activated state, the second music replay file may be temporarily stopped. In this state, when the tapping input 1020 is again applied, the second music replay file may be continuously replayed.

Figure 16:
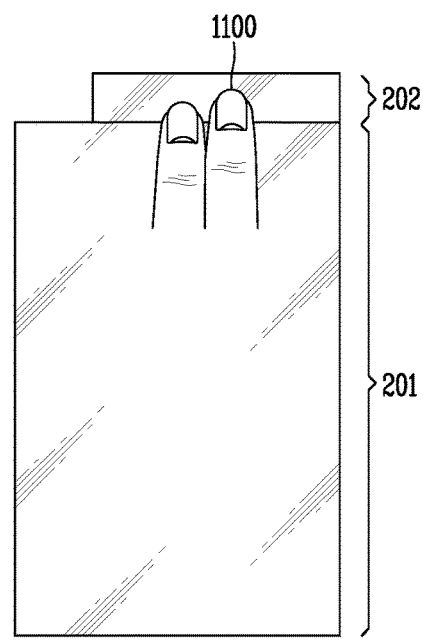
FIG. 16 is a conceptual view illustrating an embodiment in which a music file being currently replayed is registered as a preferred music genre.

FIG. 16 is a conceptual view illustrating an embodiment in which a music file being currently replayed is registered as a preferred music genre. Referring to FIG. 16, a touch input 1100 using two fingers is applied to the second area 202 in the non-activated state, the second music replay file being currently replayed may be registered as a preferred music genre.

Figure 17:
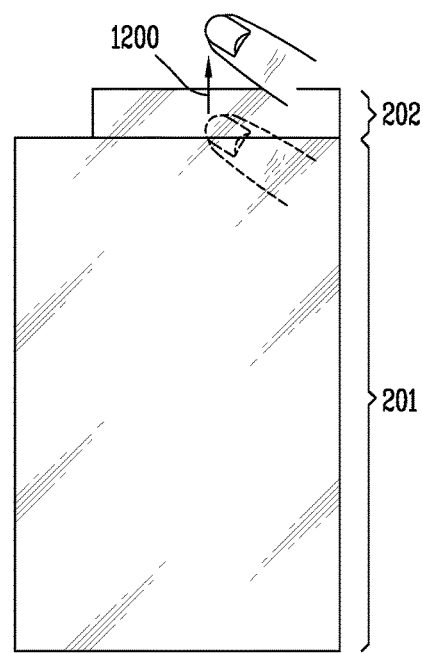
FIG. 17 is a conceptual view illustrating an embodiment in which a music file being currently replayed is deleted from a corresponding relay list.

FIG. 17 is a conceptual view illustrating an embodiment in which a music file being currently replayed is deleted from a corresponding relay list. Referring to FIG. 17, a swipe input 1200 to the upside is applied to the second area 202 in the non-activated state, the second music replay file being currently replayed may be deleted from a corresponding replay list.

Figure 18:
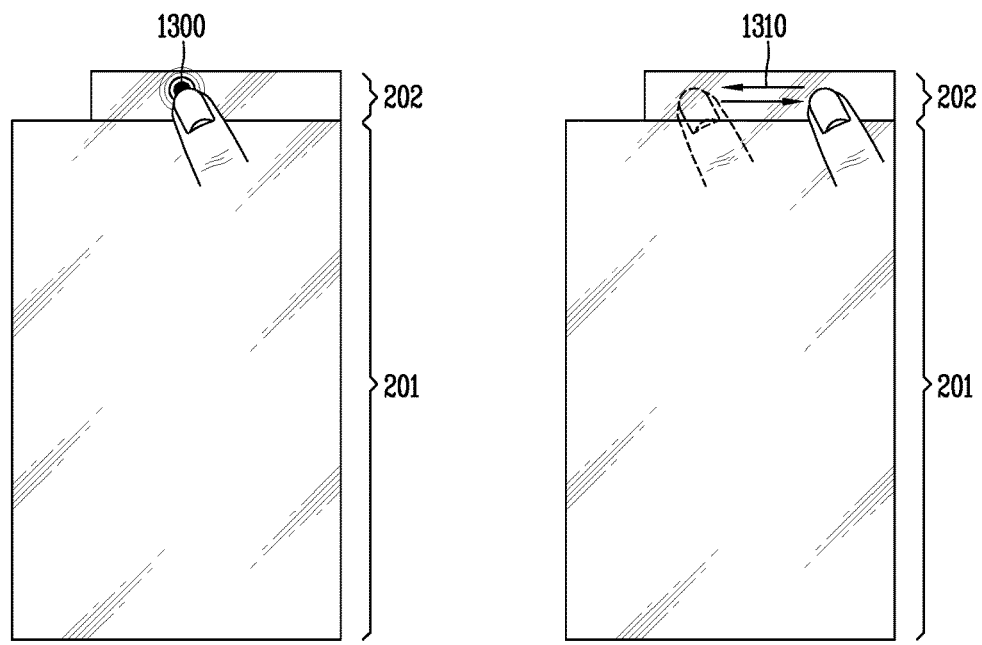
FIG. 18 is a conceptual view illustrating an embodiment in which a seek bar of a music file being currently replayed is executed.

FIG. 18 is a conceptual view illustrating an embodiment in which a seek bar of a music file being currently replayed is executed. Referring to FIG. 18, when a long touch input 1300 is applied to the second area 202 in the non-activated state, and a swipe input 1310 to the left or right side is then applied to the second area 202, a seek bar of the second music replay file may be executed through an input applied to the seek bar. As an embodiment, when the swipe input 1310 to the left or right side is applied, fast winding or rewinding of the second music replay file may be executed, or a specific section may be detected.

Figure 19:
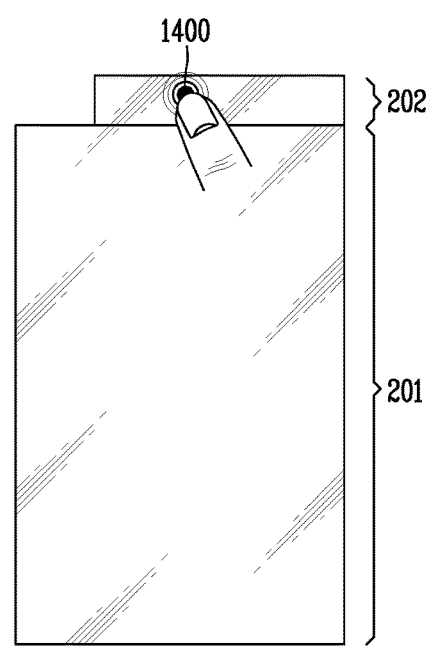
FIG. 19 is a conceptual view illustrating an embodiment in which the music control mode is released.

FIG. 19 is a conceptual view illustrating an embodiment in which the music control mode is released. Referring to FIG. 19, if a long touch input 1400 is applied to the second area 202 in the non-activated state, the music control mode may be released. As an embodiment, when any user input is not applied for a predetermined time, the music control mode may be released. In this instance, a notification sound or vibration for notifying that the music control mode has been released can be output together with the release of the music control mode.

The mobile terminal and the method for controlling the same according to the present disclosure have the following advantages. According to the present disclosure, an extension area which extends from a main area and has a different shape from the main area is provided, so that it is possible to extending the display area of information.

Also, different replay files can be executed according to the kinds of external devices. In this instance, only the extension area is used, thereby reducing the power consumption of a battery. Further, a music file preferred by a user can be replayed when the mobile terminal is connected to a headset. In addition, a music file to which the user listens together with the user's family can be replayed when the mobile terminal is connected to a Bluetooth device of a vehicle.

In addition, the replay of a music file can be controlled by applying a touch input to the extension area. As a result, it is possible to solve a problem that when the user listens to a music file by using a control input unit, it was difficult to control the replay of the music file. In addition, it is possible to overcome the existing limitation that when the state of the display unit was switched in the non-activated state, it was difficult to recognize a gesture. Also, the user can control the replay of a music file without staring at a screen, thereby improving user's convenience.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a display including a first area and a second area extended in at least one direction of the first area;
a wireless communication processor configured to wirelessly communicate with a first external device; and
a controller configured to:
control the wireless communication processor to communicate with the first external device while the first area and the second area are in a non-activated state,
switch a state of the second area to an activated state from the non-activated state, based on the mobile terminal being connected to the first external device when the first area and the second area are non-activated,
display, in the second area, visual information corresponding to at least one first replay file executed when the mobile terminal was previously connected to the first external device, wherein the non-activated state of the first area is maintained while the visual information corresponding to the at least one first replay file is displayed in the second area, execute the at least one first replay file based on a predetermined touch input applied to the second area while the first area is in the non-activated state, switch a state of the first area to an activated state from the non-activated state based on detecting a predetermined touch input, display, in the first area, a list of a plurality of devices which can be connected to the mobile terminal, connect the mobile terminal to a second external device different from the first external device based on detecting a predetermined touch input selecting the second external device from the list of the plurality of devices, display, in the second area, visual information corresponding to at least one second replay file executed when the mobile terminal was previously connected to the second external device, and execute the at least one second replay file, based on a predetermined touch input being applied to the second area.

2. The mobile terminal of claim 1, wherein the controller is further configured to:

display, in the second area, an icon corresponding to a first replay list including the at least one first replay file.

3. The mobile terminal of claim 2, wherein the controller is further configured to:

execute the at least one first replay file included in the first replay list, based on a predetermined touch input being applied to the icon corresponding to the first replay list.

4. The mobile terminal of claim 3, wherein the controller is further configured to:

display, in the second area, visual information corresponding to a replay file being currently executed among the at least one first replay file included in the first replay list.

5. The mobile terminal of claim 3, wherein the controller is further configured to:

execute the at least one first replay file included in the first replay list by applying a volume value which was set when the mobile terminal was previously connected to the first external device.

6. The mobile terminal of claim 2, wherein the controller is further configured to:

display, in the second area, an icon corresponding to a second replay list including at least one third replay file which was executed before the mobile terminal was connected to the first external device, based on a predetermined touch input being applied to the display, and execute the at least one third replay file included in the second replay list, based on a predetermined input being applied to the icon corresponding to the second replay list.

7. The mobile terminal of claim 6, wherein the controller is further configured to:

display, in the second area, an icon corresponding to a third replay list including at least one previously set replay file, based on a predetermined touch input being applied to the display, and execute the at least one previously set replay file included in the third replay list, based on a predetermined touch input being applied to the icon corresponding to the third replay list.

8. The mobile terminal of claim 2, wherein the controller is further configured to:

display the first replay list in the first area, based on a predetermined touch input being applied to the icon corresponding to the first replay list.

9. The mobile terminal of claim 8, wherein the controller is further configured to:

delete a first replay file from the first replay list or execute the first replay file, based on a predetermined touch input being applied to an icon corresponding to the first replay file included in the first replay list.

10. A method for controlling a mobile terminal, the method comprising:

controlling a wireless communication processor to communicate with a first external device while a first area and a second area of a display are in a non-activated state, wherein the display includes the first area and the second area extended in at least one direction of the first area;

switching a state of the second area to an activated state from the non-activated state based on the mobile terminal being connected to the first external device when the first area and the second area are non-activated;

displaying, in the second area of a display extending in at least one direction of the first area of the display, visual information corresponding to at least one first replay file executed when the mobile terminal was previously connected to the first external device, wherein the non-activated state of the first area is maintained while the visual information corresponding to the at least one first replay file is displayed in the second area;

executing the at least one first replay file based on a predetermined touch input being applied to the second area, while the first area is in the non-activated state;

switching a state of the first area to an activated state based on detecting a predetermined touch input;

displaying, in the first area, a list of a plurality of devices which can be connected to the mobile terminal;

connecting the mobile terminal to a second external device different from the first external device, based on detecting a predetermined touch input selecting the second external device from the list of the plurality of devices;

displaying, in the second area, visual information corresponding to at least one second replay file executed when the mobile terminal was previously connected to the second external device; and executing the at least one second replay file, based on a predetermined touch input being applied to the second area.

11. The method of claim 10, further comprising:

displaying, in the second area, an icon corresponding to a first replay list including the at least one first replay file.

12. The method of claim 11, further comprising:

executing the at least one first replay file included in the first replay list, based on a predetermined touch input being applied to the icon corresponding to the first replay list.

13. The method of claim 12, further comprising:

displaying, in the second area, visual information corresponding to a replay file being currently executed among the at least one first replay file included in the first replay list.

14. The method of claim 12, further comprising:

executing the at least one first replay file included in the first replay list by applying a volume value which was set when the mobile terminal was previously connected to the first external device.

15. The method of claim 11, further comprising:
displaying, in the second area, an icon corresponding to a second replay list including at least one third replay file which was executed before the mobile terminal was connected to the first external device, based on a predetermined touch input being applied to the display; and
executing at least one third replay file included in the second replay list, based on a predetermined touch input being applied to the icon corresponding to the second replay list.

16. The method of claim 11, further comprising:
displaying, in the second area, an icon corresponding to a third replay list including at least one previously set replay file, based on a predetermined touch input being applied to the display; and
executing the at least one previously set replay file included in the third replay list, based on a predetermined touch input being applied to the icon corresponding to the third replay list.

17. The method of claim 11, further comprising:
displaying, in the first area, the first replay list based on a predetermined touch input being applied to the icon corresponding to the first replay list.

18. The method of claim 17, further comprising:
deleting a first replay file from the first replay list or executing the first replay file, based on a predetermined touch input being applied to an icon corresponding to the first replay file included in the first replay list.

\* \* \* \* \*